June 17, 1930.   H. THOMA   1,763,994
FRICTIONLESS SLIDING VALVE FOR SELF ACTING REGULATORS OR GOVERNORS
Filed Feb. 26, 1926
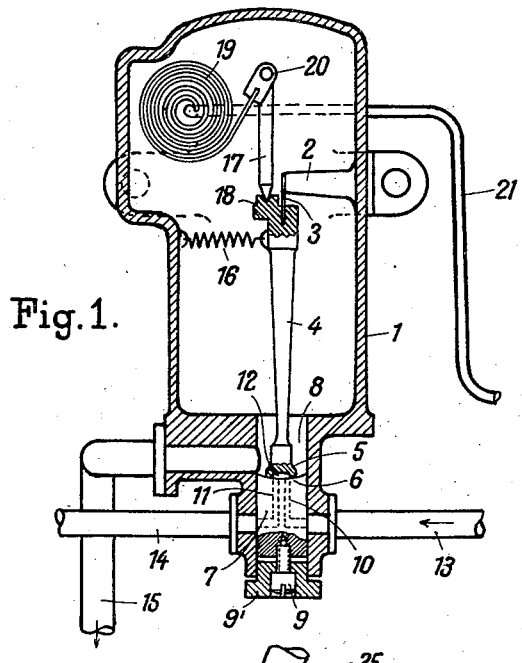
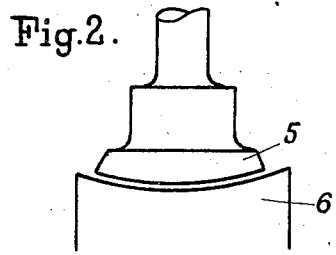
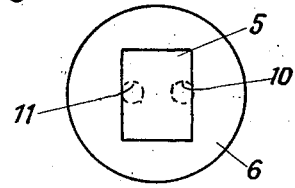
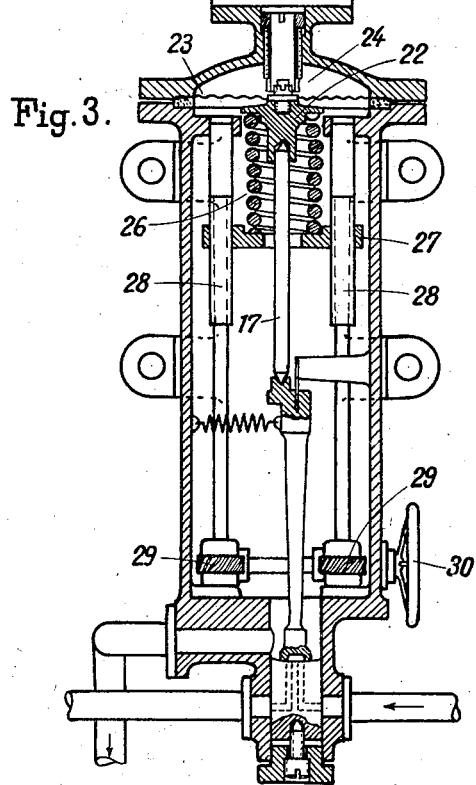
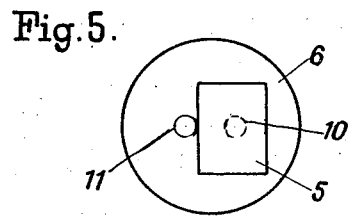
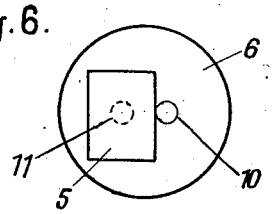
Inventor:
Hans Thoma
by Cooke, Kellenberk & Farley
Attorneys Patented June 17, 1930

1,763,994

UNITED STATES PATENT OFFICE

HANS THOMA, OF MUNICH, GERMANY

FRICTIONLESS SLIDING VALVE FOR SELF-ACTING REGULATORS OR GOVERNORS

Application filed February 26, 1926, Serial No. 90,985, and in Germany February 26, 1925.

This invention relates to valves of the sliding or non-rotary type, and has for its object to provide a very sensitive valve of this character so constructed as to eliminate friction and wear at the active portion of the valve, where the latter co-operates with the member containing the ports or channels controlled by the valve. I attain improved results by suspending or supporting the valve in a novel manner, and also by an appropriate novel construction of the co-operating portions of the valve and of the member the ports or channels of which are controlled by such valve.

Satisfactory embodiments of my invention will now be described as examples with reference to the accompanying drawings, in which Fig. 1 is a vertical section showing one form of my invention; Fig. 2 is an enlarged detail elevation showing the valve proper and the ported member with which it co-operates; Fig. 3 is a vertical section showing another embodiment of my invention; and Figs. 4, 5, and 6 are diagrammatic plan views of the valve proper and the co-operating ported member, illustrating three different relative positions of these parts.

In Figs. 1 and 3, 1 indicates a casing within which is located an arm or bracket 2 provided at its inner portion with a flat spring 3 serving as a suspension member for an arm 4 which is vertical in its central position, shown in said figures. Owing to this suspension, the arm 4 is adapted to swing laterally about an axis located substantially at the junction of the spring 3 with the bracket 2. The lower end of the arm 4 is formed with the valve proper 5, the lower surface of which is of cylindrical curvature, the axis of the curvature cylinder coinciding practically with the axis about which the suspended arm 4 is adapted to swing. The valve 5 is somewhat in the nature of a slide valve, being adapted to move laterally adjacent to a similarly curved stationary ported surface 6 in a member or plug 7 which is fitted into a chamber 8 of the casing 1 and secured in place by means of a cover or cap 9' and a screw 9, the latter also enabling the plug 7 to be adjusted up or down, toward or from the valve 5. It is not intended, however, that the valve should come in actual contact with the upper surface of the plug 7, but as shown distinctly in Fig. 2, a space is left between said parts, and the thin film of oil or other liquid which fills said space is relied upon to complete the sealing effect of the valve with a very slight leakage of such liquid. It will be seen that as the lower surface of the valve 5 and the adjacent upper surface of the stationary ported member or plug 7 do not come in contact with each other, there will be absolutely no wear at these surfaces. The suspension of the swinging arm 4 by means of a flexible member such as the flat spring 3 avoids all friction and wear such as would be inevitable if the upper end of said arm were hung on a pivot pin.

Within the stationary valve member or plug 7 are provided channels 10, 11 which in the central position of the valve 5 (Figs. 1, 3, and 4) communicate with each other by way of a recess 12 in the lower surface of the valve 5. The channel 10 communicates with a pipe 13 connected with a supply of oil or other liquid under pressure, and the channel 11 communicates with a pipe 14 leading the pressure liquid from the channel 11 to the apparatus to be operated (not shown), for instance a servo-motor or other control. The chamber 8 in which the valve 5 moves laterally, and the interior of the casing 1, communicates with a liquid-discharge pipe 15.

The arm 4 is under the influence of two antagonistic forces, one of which is constituted by the spring 16 tending to pull said arm toward the left in Figs. 1 and 3, said spring having one end secured to the casing 1 and the other to the arm 4, below the suspension point about which the arm swings. The other force, which tends to push the lower end of said arm 4 toward the right in Figs. 1 and 3, exerts a downward pressure by means of a pin 17, on a boss or lug 18 located at the upper end of said arm, to one side of its suspension axis or suspension point. When the two forces are balanced, the arm 4 will be vertical, and the valve 5 in its central position; according as one force or the other becomes preponderant, the lower end of the arm 4, with the valve 5 thereon, will be moved toward the left or toward the right.

The constructions shown in Figs. 1 and 3 are substantially alike as to the features described so far. They differ, however, in regard to the means for effecting a downward pressure on the pin 17. According to Fig. 1, a Bourdon pipe 19 is employed, its free end being pivotally connected at 20 with the upper end of the pin 17. The other end of said pipe is connected wih a capillary conduit 21, closed at its other end which is located within a heating vessel, a room, or any place the temperature of which is to govern the operation of the apparatus shown in Fig. 1, by the movements which the Bourdon pipe 19 will perform in response to variations in the temperature of said room, vessel, etc. It is well-known that as the temperature rises or falls, the Bourdon pipe will expand or contract or rather coil or uncoil according to the expansion or contraction of the fluid (for instance mercury) contained in the capillary spirally coiled tube constituting the Bourdon pipe. Thus the downward pressure on the pin 17 will vary in accordance with variations in temperature.

The construction shown in Fig. 3 is responsive to changes in pressure, instead of responding to temperature changes. For this purpose, the upper end of the pin 17 engages a member 22 secured to the central portion of a diaphragm 23, the edge of which is fastened to the casing 1. The closed chamber 24 located above the diaphragm 23 communicates with a pipe 25 connected with a reservoir or other source of a fluid under constant pressure (not shown). A coiled spring 26 acts on the member 22 in opposition to the pressure of the fluid in the chamber 24, and the normal tension of said spring may be adjusted by moving the cross head 27 against which the lower end of the spring bears. The particular adjusting mechanism illustrated consists of screw spindles 28, worm gearing 29, and a hand wheel 30.

The control of the flow of liquid by the valve 5 is the same whether the movement of said valve is effected by the mechanism of Fig. 1 or that of Fig. 3. In each case, as the temperature or the pressure rises, the valve will be moved from the normal or central position shown in Figs. 1, 2, 3, and 4, to the position illustrated in Fig. 5. In the central position of the valve 5, the pressure liquid supplied through pipe 13 will pass from the channel 10 to the recess 12, the other channel, 11, and the pipe 14 to the servo-motor or other device controlled by such liquid. With the valve 5 in the position of Fig. 5, however, the pressure liquid from pipe 13 can flow no farther than the recess 12 of the valve, since said recess is no longer in communication with the port at the upper end of channel 11. On the other hand, such port at that time communicates with the interior of the chamber 8, and through it, with the discharge pipe 15. Under these conditions, therefore, pressure liquid will not reach the servo-motor or other controlled device, and the servo-motor, relieved from the pressure of the liquid, is shifted in the one direction, for instance by the counter pressure of a spring, the pressure liquid, which flows back from the servo-motor through the pipe 14 and the now open channel 11 to the chamber 8, being free to escape from the latter through the discharge pipe 15. On the other hand, a decrease in temperature or pressure respectively will cause the valve 5 to move to the position shown in Fig. 6, so that the pressure liquid will pass from the pipe 13 through the channel 10 to the chamber 8, and from thence escapes through the discharge pipe 15 to the port of the servo-motor opposite without in anyway influencing the servo-motor. The valve 5, in this position, closes the upper end of the channel 11 so that the valve 5 hydraulically seals the liquid in the channel 11 and pipe 14 whereby the servo-motor is maintained in the position to which it was adjusted by the pressure liquid.

In order to avoid any detrimental reaction of the flow of the liquid, at the time the valve 5 is shifted, it is advisable to bevel the port-controlling edges of the valve or slide 5, as has been indicated in Fig. 2.

Various modifications may be made without departing from the nature of my invention as set forth in the appended claims; in particular, other devices than the ones illustrated may be employed for moving the slide or valve 5 adjacent to, or across, the surface 6 in which the ports of the channels 10, 11 are provided. While I prefer the arrangement shown, in which said surface 6 and the adjacent surface of the slide or valve 5 are curved, I do not wish to restrict my self to this specific construction.

What I claim is:

1. In a self acting regulator the combination with a sliding valve, of a frictionless suspending device for allowing said valve to swing about a point situated outside of the valve face, the suspension device consisting of a neutral flat spring for avoiding the friction and the play of a pivot at the place of suspension.

2. In a self acting regulator the combination with a sliding valve, of a frictionless suspending device for allowing said valve to swing about a point situated outside of the valve face, the suspension device consisting of a neutral flat spring for avoiding the friction and the play of a pivot at the place of suspension, an arm carrying said valve and suspended from the flat spring and kept under the influence of a spring and a variable power device acting eccentrically to the suspension point.

3. In a self acting regulator the combination with a sliding valve of a frictionless suspending device for allowing said valve to swing about a point situated outside of the valve face, and a ported member co-operating with said valve, and adjustable toward and from the same.

4. In a self acting regulator the combination with a sliding valve of a frictionless suspending device for allowing said valve to swing about a point situated outside of the valve face, a ported member co-operating with said valve, the port-controlling edges of the valve being beveled for the purpose of avoiding detrimental reaction of the flowing liquid.

In testimony whereof I have affixed my signature.

HANS THOMA.